United States Patent
Matsushita et al.

(10) Patent No.: US 8,746,864 B2
(45) Date of Patent: *Jun. 10, 2014

(54) FILTER AND INK-JET RECORDING APPARATUS HAVING THE SAME

(71) Applicant: Hitachi Industrial Equipment Systems Co., Ltd., Tokyo (JP)

(72) Inventors: Takehiko Matsushita, Hitachi (JP); Toshihide Nagamine, Toukai (JP); Takahiro Arima, Hitachi (JP)

(73) Assignee: Hitachi Industrial Equipment Systems Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/671,683

(22) Filed: Nov. 8, 2012

(65) Prior Publication Data

US 2013/0307910 A1 Nov. 21, 2013

Related U.S. Application Data

(62) Division of application No. 12/543,964, filed on Aug. 19, 2009, now Pat. No. 8,308,283.

(30) Foreign Application Priority Data

Jun. 12, 2009 (JP) ................................. 2009-141247

(51) Int. Cl.
*B41J 2/17* (2006.01)
*B41J 2/175* (2006.01)
*B01D 35/30* (2006.01)
*B01D 36/04* (2006.01)

(52) U.S. Cl.
CPC ............. *B41J 2/17563* (2013.01); *B01D 35/30* (2013.01); *B01D 36/04* (2013.01)
USPC ........................................................... 347/93

(58) Field of Classification Search
CPC ...... B41J 2/17563; B01D 35/30; B01D 36/04
USPC ............................................................ 347/93
See application file for complete search history.

(56) References Cited

U.S. PATENT DOCUMENTS

| | | | |
|---|---|---|---|
| 5,331,339 A | | 7/1994 | Takahashi |
| 8,308,283 B2 * | | 11/2012 | Matsushita et al. ............. 347/93 |
| 2004/0065627 A1 | | 4/2004 | Loser |
| 2007/0109365 A1 | | 5/2007 | Okuda et al. |
| 2010/0315473 A1 * | | 12/2010 | Matsushita et al. ............. 347/93 |

FOREIGN PATENT DOCUMENTS

| | | |
|---|---|---|
| EP | 0560332 A2 | 9/1993 |
| JP | 61-173945 A | 8/1986 |
| JP | 06-340088 A | 12/1994 |

(Continued)

OTHER PUBLICATIONS

Japan Patent Office office action for application JP2009-141247 (Jan. 8, 2013).

*Primary Examiner* — Stephen Meier
*Assistant Examiner* — Alexander D Shenderov
(74) *Attorney, Agent, or Firm* — Kilpatrick Townsend & Stockton LLP

(57) ABSTRACT

A filter, the alignment of which does not need to be adjusted, and an ink-jet recording apparatus having such a filter are provided, the ink-jet recording apparatus capable of avoiding leakage of residual liquids in filter exchange operation. The filter of the present invention includes an upper capsule member, a lower capsule member, and a filter medium. The upper capsule member has a central connecting port and a peripheral connecting port, and also has a pipe section that extends, within the capsule, from the peripheral connecting port to the vicinity of the bottom surface (the deepest section) of the lower capsule member. A liquid supplied from the peripheral connecting port via the pipe section is filtered through the filter medium, and the filtered liquid is output from the central connecting port.

6 Claims, 11 Drawing Sheets

(56) References Cited

FOREIGN PATENT DOCUMENTS

| JP | 09-029998 A | 2/1997 |
| JP | 2000-225713 A | 8/2000 |
| JP | 2004-34029 A | 2/2004 |
| JP | 2004-230321 A | 8/2004 |
| JP | 2004-322509 A | 11/2004 |
| JP | 2007-136705 A | 6/2007 |
| JP | 2007-275814 A | 10/2007 |

* cited by examiner

PRIOR ART

FILTER AND INK-JET RECORDING APPARATUS HAVING THE SAME

CROSS-REFERENCE TO RELATED APPLICATION

This application is a divisional application of U.S. patent application Ser. No. 12/543,964, filed Aug. 19, 2012, which claims priority from Japanese Application JP 2009-141247, filed on Jun. 12, 2009, all of which are herein incorporated by reference in their entirety for all purposes.

BACKGROUND OF THE INVENTION

1. Field of the Invention

The present invention relates to a filter and an ink-jet recording apparatus having the same.

2. Background Art

In ink-jet recording apparatuses, ink stored in an ink container of the main body is pumped into a nozzle of an ink discharge head by a feed pump. During operation, ink is continuously discharged from a discharge orifice of the nozzle and broken into particles. Among ink particles discharged from the nozzle, those used for printing are electrostatically charged and deflected, and then land on a print medium to form text thereon. Meanwhile, ink particles not used for printing are not electrostatically charged or deflected, but travel into an opening of a gutter that is located along the direction straight ahead of the discharge orifice of the nozzle, and are collected into the ink container by a recovery pump for re-use purposes.

There are cases in which foreign substances adhere to the inner side of the discharge orifice of the nozzle or to the circumference thereof during operation, whereby the direction of ink discharged from the discharge orifice could change. In such cases, ink particles not used for printing could deviate from the opening of the gutter, thereby contaminating the inner side of the ink discharge head, production facilities, products, and the like, or the discharge orifice could become clogged, thereby preventing ink from being discharged or printed. Examples of foreign substances include dust in air that is sucked into the gutter during operation and dust in air that enters an ink supply unit while ink is being supplied. Such dust will reach the nozzle through the channel of the ink. In order to remove such foreign substances, the ink jetrecording apparatus has a filter provided in the channel upstream of the nozzle.

FIG. 1 illustrates an exemplary structure of a conventional filter. As illustrated in FIG. 1, a conventional filter 700 includes a capsule member 701 with a connecting port 711 and a capsule member 702 with a connecting port 712 that are joined together in the form of a single capsule. Within the capsule is provided a cylindrical filter medium 703. One end face of the filter medium 703 is joined to the capsule member 701 and the other end face thereof is joined to a cap member 704. The two connecting ports communicate with each other through the filter medium 703. The two connecting ports of the filter 700 face opposite directions. Thus, there is a possibility that when the old filter is removed for the purpose of being replaced with a new one in filter exchange operation, drops of ink remaining in the old filter could contaminate the surrounding area.

As a filter that solves the aforementioned problem, a filer having two connecting ports that face the same direction has been considered. FIG. 2 illustrates an exemplary structure of such a conventional filter. As illustrated in FIG. 2, a filter 500 has a top capsule member 501 with two connecting ports (i.e., a central connecting port 511 and a peripheral connecting port 512) and a bottom capsule member 502 that are joined together in the form of a single filter capsule. One end face of a cylindrical filter medium 503 provided in such a filter capsule is joined to the capsule member 501 and the other end face thereof is joined to a cap member 504. Since the two connecting ports of the filter 500 face the same direction, there is an advantage in that it is possible to reduce the possibility of contaminating the surrounding area with ink drops by adjusting the orientations of the two connecting ports such that they face upwards in removing the old filter in filter exchange operation.

FIG. 3 is a systematic diagram of an ink circulation system that uses the filter 500. The filter 500 is disposed in a channel 680 between an ink container 601 and a nozzle 651 with a feed pump 611 interposed between the filter 500 and the ink container 601. In addition, a branch 641 leading to a channel 682 that communicates with a suction port of a recovery pump 613 is disposed in a channel 681 between the filter 500 and the nozzle 651.

In removing the old filter in filter exchange operation, it is necessary to remove the ink remaining in the filter in order to reduce the possibility of contaminating the surrounding area with the ink. FIG. 4 illustrates the flow of ink in removal of the ink. In FIG. 4, the ink container is exposed to air. With such a flow, ink in the ink container or ink channel is displaced by air so that the ink is discarded to the outside of the apparatus. FIG. 5 illustrates the orientation of the filter in removal of the ink. As illustrated in FIG. 5, the orientation of the filter 500 is set so that the two connecting ports thereof (i.e., the central connecting port 511 and the peripheral connecting port 512) face the horizontal direction with the peripheral connecting port 512 located on the lower side of the central connecting port 511. Ink flows in the direction from the central connecting port to the peripheral connecting port 512. Since the ink located above the peripheral connecting port 512 of the filter during removal of the ink is displaced by air, almost all the ink can be discharged.

Meanwhile, after the ink is removed and the filter is replaced with a new one, it is necessary to remove air from the new filter. Removal of air is necessary in order to prevent the residual air from flowing out of the filter and thereby reaching the nozzle during operation, which could otherwise cause ink splattering when it is discharged from the discharge orifice, and thus could contaminate the inner side of the ink discharge head, production facilities, products, and the like, or ink particles may not be deposited onto a desired place, resulting in abnormal printing. FIG. 6 illustrates the flow of ink in removal of air. With such a flow, an ink channel is filled with ink of an ink supply reservoir. FIG. 7 illustrates the orientation of the filter in removal of air. As illustrated in FIG. 7, the orientation of the filter 500 is set so that the two connection ports thereof face the horizontal direction with the peripheral connecting port 512 located on the upper side of the central connecting port 511. Upon entry of ink into the central connecting port 511, air is discharged from the upper peripheral connecting port 512. Thus, almost all the air in the filter can be displaced by the ink. [Reference 1] JP Patent Publication (Kokai) No. 2004-230321 A

SUMMARY OF THE INVENTION

However, in ink jetrecording apparatuses that use the conventional filter 500, an operator needs to check the orientation of the filter 500 or appropriately adjust the orientation of the filter 500 in a series of operations of replacing the filter 500. Thus, if the operator fails to adjust the orientation of the filter 500 or adjusts the orientation of the filter 500 in error, there is a possibility that the old filter may be removed with ink still remaining therein, or the apparatus may be operated with air remaining in the new filter, which can cause ink contamination or abnormal printing. Although it is possible to provide a mechanism that automatically adjusts the orientation of the filter, it will increase the production cost of the ink-jet recording apparatus.

The present invention has been made in view of the foregoing, and it is an object of the present invention to provide a filter, the orientation of which does not need to be adjusted, and an ink-jet recording apparatus having such a filter while reducing the possibility of contaminating the surrounding area in filter exchange operation.

In order to achieve the aforementioned object, the filter of the present invention includes an upper capsule member, a lower capsule member, and a filter medium. The upper capsule member has a central connecting port and a peripheral connecting port, and also has a pipe section that extends, within the capsule, from the peripheral connecting port to the vicinity of the bottom surface (the deepest section) of the lower capsule member. A liquid supplied from the peripheral connecting port via the pipe section is filtered through the filter medium, and the filtered liquid is output from the central connecting port.

The upper capsule member has on its inner side a dome-shaped top surface, and the connecting port (the central connecting port) is arranged at the center of the dome-shaped top surface. Further, the lower capsule member has on its inner side a dome-shaped first bottom surface section, a second bottom surface section (the deepest section) located opposite an end of the pipe section, and a channel connecting the first bottom surface section and the second bottom surface section, the channel being adapted to guide the filtered liquid from the first bottom surface section to the second bottom surface section. The channel of the lower capsule member has a sloped section leading from the central portion of the first bottom surface section to the second bottom surface section.

The ink jetrecording apparatus of the present invention includes the aforementioned filter, a nozzle that discharges ink used for printing, an ink container in which the ink is stored, a feed pump that pumps the ink to the nozzle, and a recovery pump that collects the ink into the ink container. In addition, a branch leading to a channel that communicates with a suction port of the recovery pump is provided in a channel between the feed pump and the filter. Further features of the present invention will become apparent from the following preferred embodiments for carrying out the present invention and the accompanying drawings.

According to the present invention, it is possible to eliminate the need for adjusting the orientation of a filter in a series of filter exchange operations. Thus, the operator can save the effort of checking the orientation of the filter, and it is also possible to reduce the possibility of ink contamination and abnormal printing that could otherwise be caused due to the ink remaining in the old filter or the air remaining in the new filter.

Figure 1:
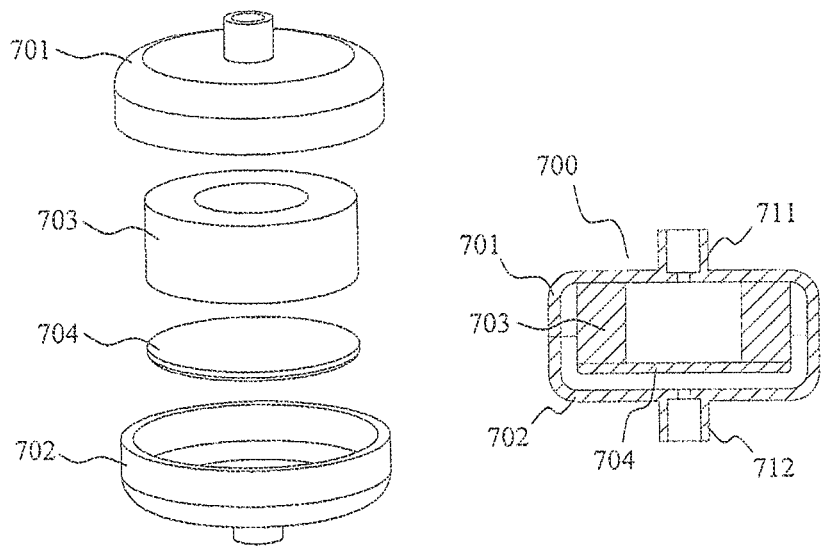
FIG. 1 are an exploded perspective view and a cross-sectional view of a filter of a conventional ink-jet recording apparatus.
Figure 2:
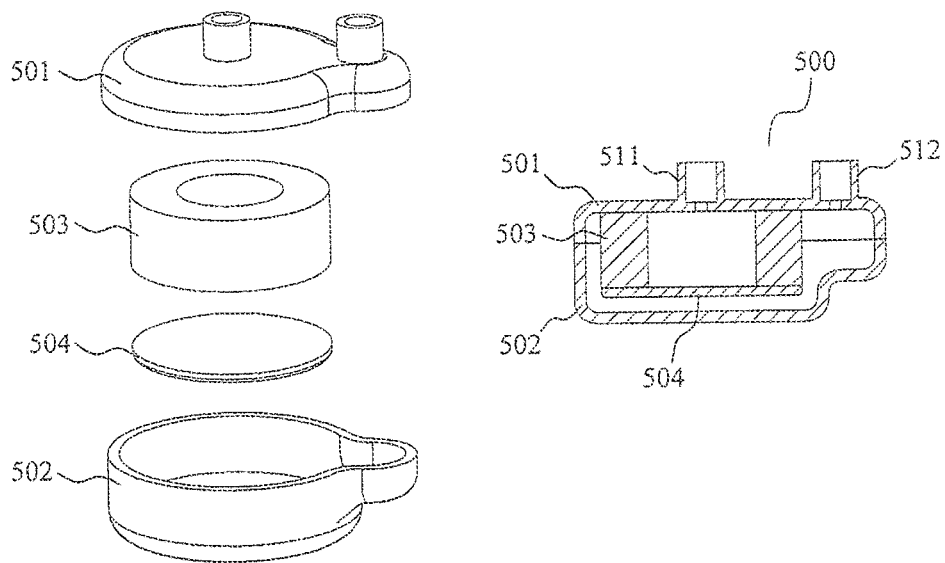
FIG. 2 are an exploded perspective view and a cross-sectional view of a filter of a conventional ink-jet recording apparatus.
Figure 3:
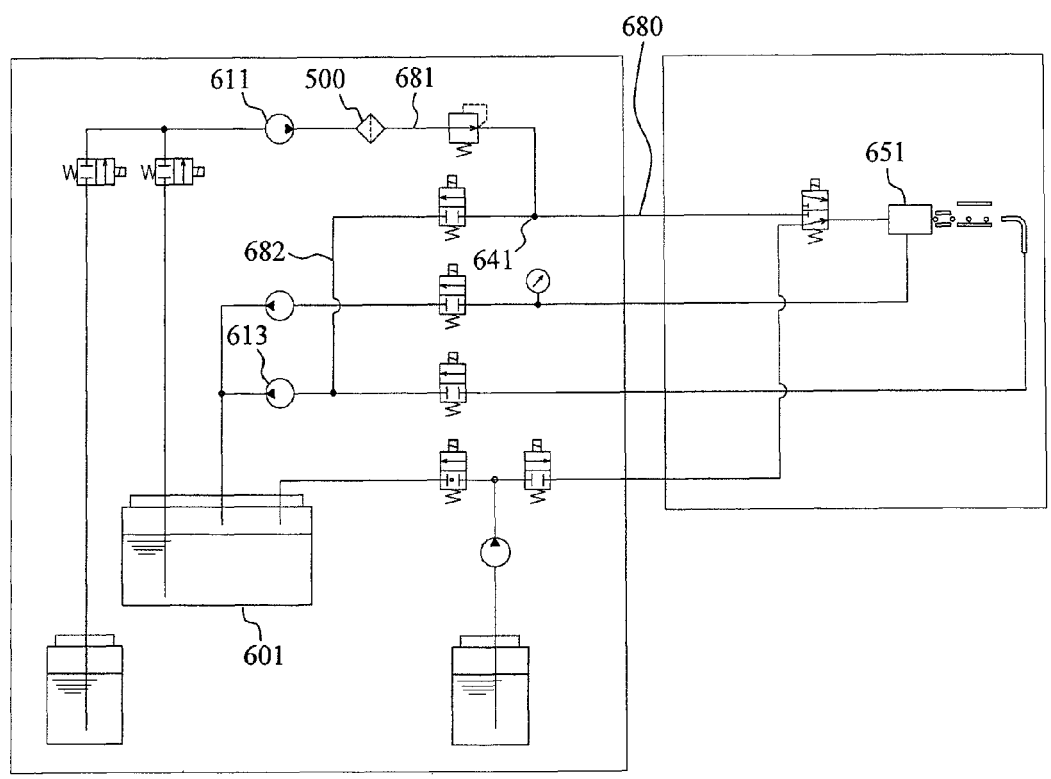
FIG. 3 is a systematic diagram of an ink circulation system of a conventional ink jet recording apparatus.
Figure 4:
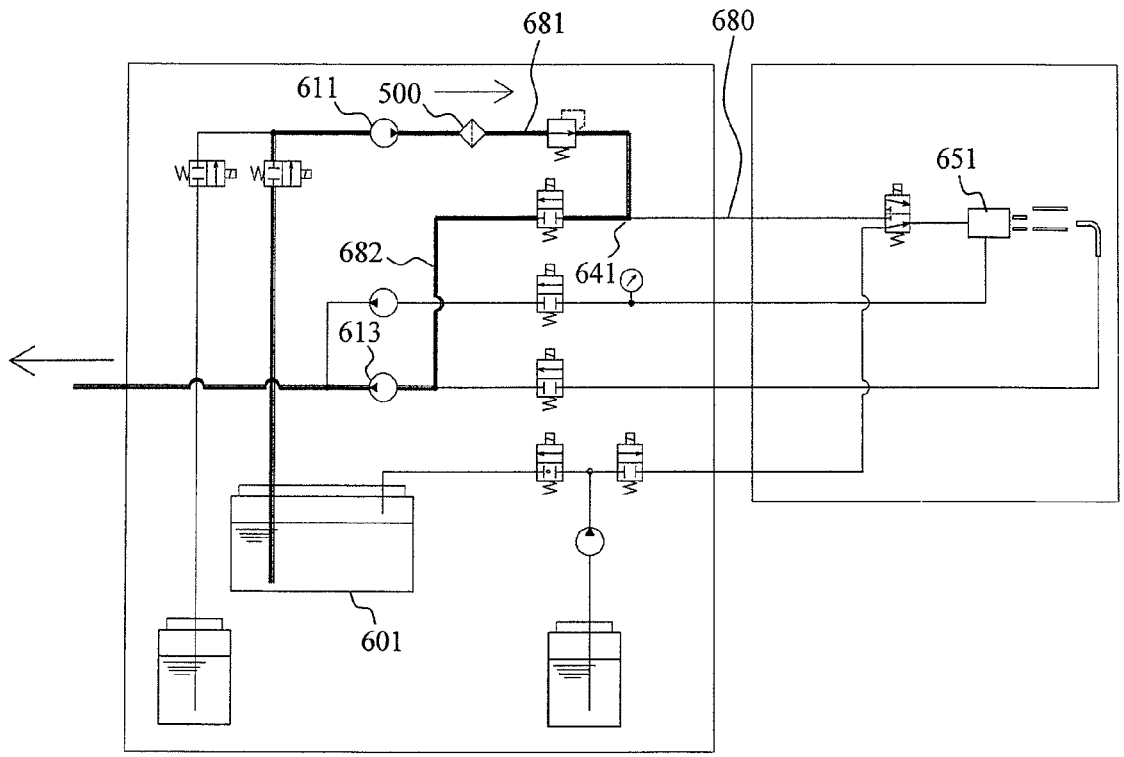
FIG. 4 is a systematic diagram illustrating the flow of ink in removal of the ink from a filter of a conventional ink-jet recording apparatus.
Figure 5:
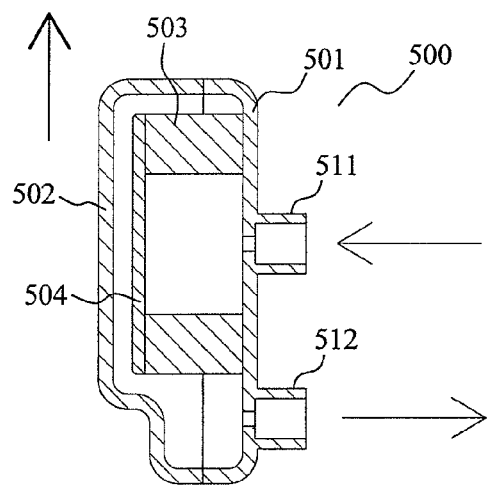
FIG. 5 is a cross-sectional view illustrating the orientation of a filter of a conventional ink-jet recording apparatus in removal of ink from the filter.
Figure 6:
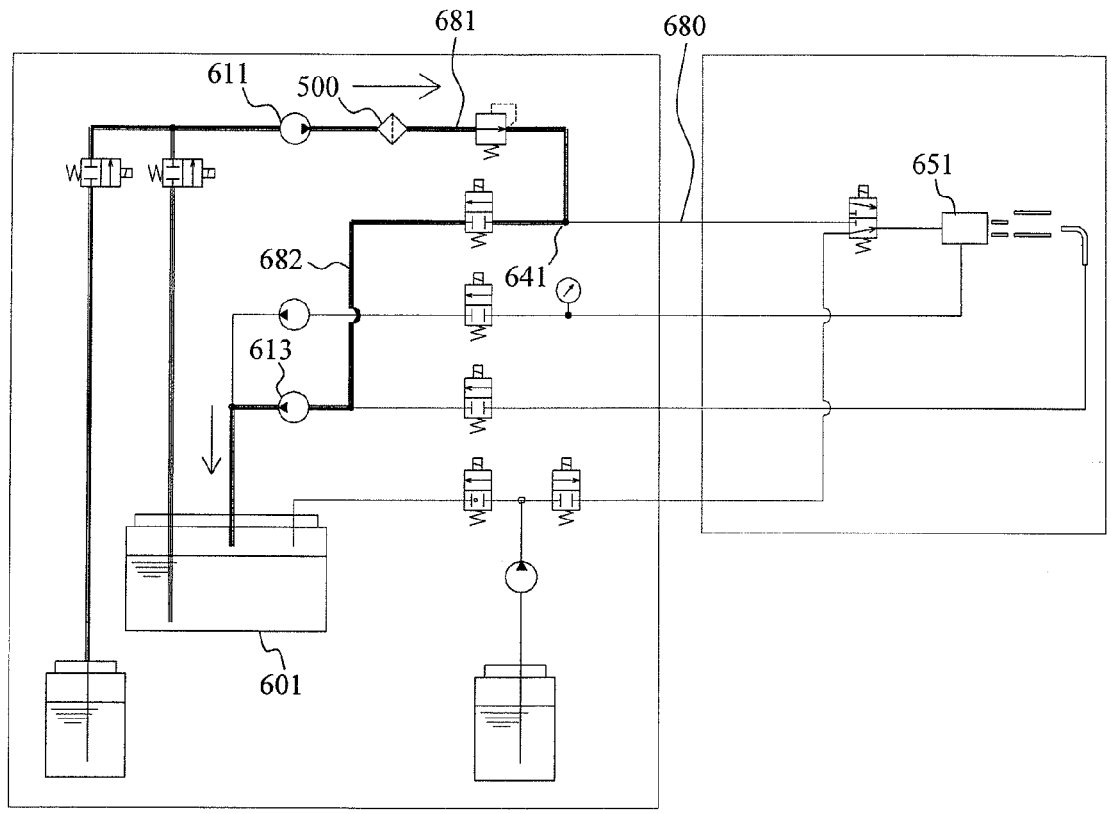
FIG. 6 is a systematic diagram illustrating the flow of ink in removal of air from a filter of a conventional ink-jet recording apparatus.
Figure 7:
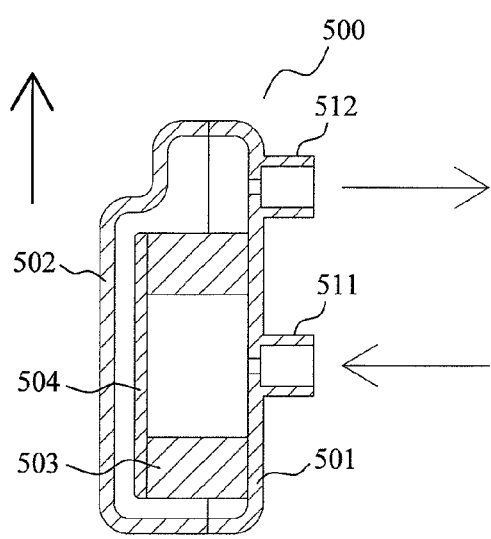
FIG. 7 is a cross-sectional view illustrating the orientation of a filter of a conventional ink-jet recording apparatus in removal of air from the filter.

DESCRIPTION OF SYMBOLS 1 main body
2 ink discharge head
3 operation display section
4 conduit
15 belt conveyor
16 encoder
17 print sensor
100 ink-jet recording apparatus
101 MPU
102 ROM
103 RAM
104 input device
105 output device 111 excitation voltage generating circuit
112 charging voltage generating circuit
113 deflection voltage generating circuit
114 solenoid valve control circuit
200 filter
201 capsule member
202 capsule member
203 filter medium
204 cap member
211 central connecting port
212 peripheral connecting port
235 top surface section
245 bottom surface section (first bottom surface section)
240 sloped section
250 deepest section
301 ink container
302 ink supply reservoir
303 solvent supply reservoir
311 feed pump
312 circulation pump
313 recovery pump
314 solvent pump
321 solenoid valve
322 solenoid valve
323 solenoid valve
324 solenoid valve
325 solenoid valve
326 solenoid valve
327 solenoid valve
328 three-way solenoid valve
331 pressure-reducing valve
332 pressure gauge
351 nozzle
352 charging electrode
353 deflection electrode
354 gutter
360 ink particles

DETAILED DESCRIPTION OF THE PREFERRED EMBODIMENTS

Hereinafter, embodiments of the present invention will be described with reference to the accompanying drawings. It should be noted that the following embodiments are illustrative only for the purpose of carrying out the present invention, and are not intended to limit the technical scope of the present invention. In addition, structures that are common to all of the drawings are denoted by common reference numerals.

<External Appearance and Use State of Ink-jet Recording Apparatus>

Figure 14:
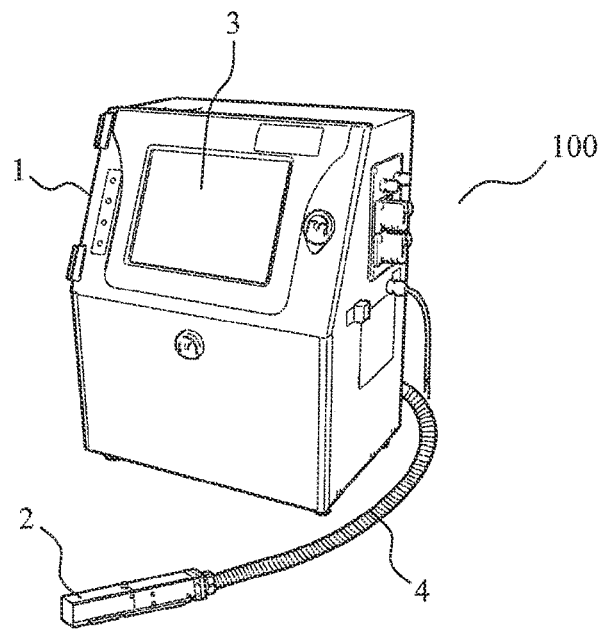
FIG. 14 is a perspective view illustrating the external appearance of an ink jetrecording apparatus in accordance with an embodiment of the present invention.

FIG. 14 illustrates the external appearance of an ink jetrecording apparatus 100 in accordance with an embodiment of the present invention. The ink jetrecording apparatus 100 includes a main body 1 with an operation display section 3 externally mounted thereon and an ink discharge head 2 connected to the main body 1 with a conduit 4.

Figure 15:
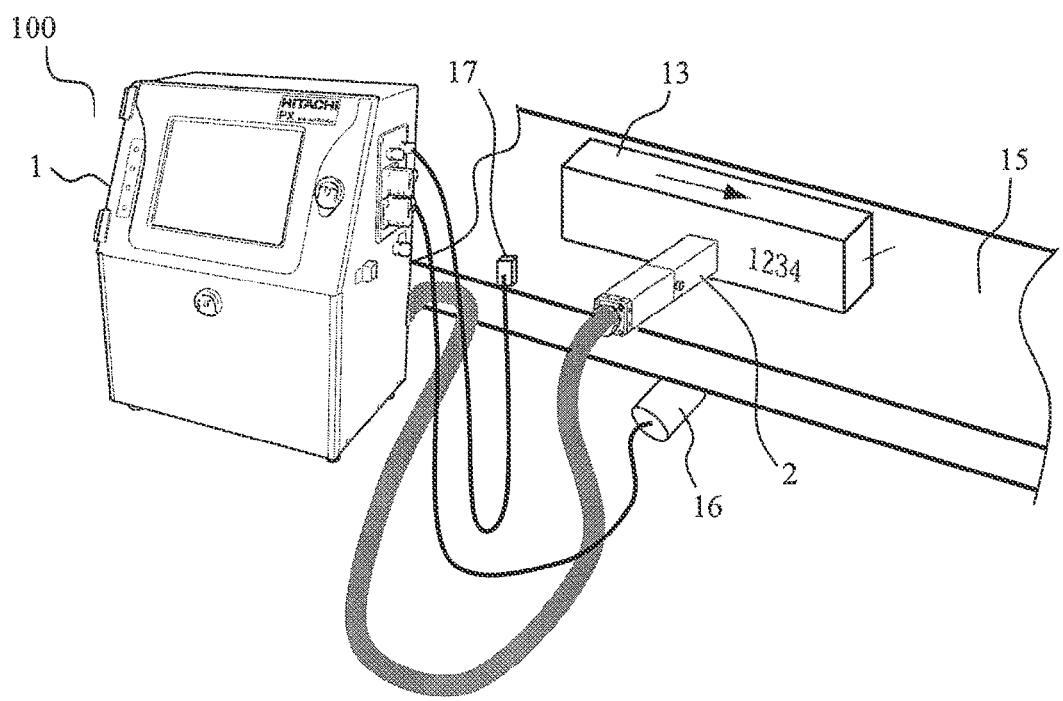
FIG. 15 is a perspective view illustrating the use state of an ink jetrecording apparatus in accordance with an embodiment of the present invention.

FIG. 15 illustrates an example of the actual use state of the ink-jet recording apparatus 100. The ink-jet recording apparatus 100 is installed on, for example, a production line of a factory in which foods, beverages, and the like are produced. The main body 1 is installed in a position where the user can operate the apparatus, and the ink discharge head 2 is installed in a position that can be in proximity to an object 13 on which text is to be printed (hereinafter referred to as a print medium 13) that is transported on a production line such as a belt conveyor 15.

In order to print characters with the same width regardless of the transport speed, an encoder 16 that outputs a signal corresponding to the transport speed to the ink-jet recording apparatus 100 as well as a print sensor 17 that outputs a signal instructing the ink-jet recording apparatus 100 to print text upon detection of the print medium 13 is installed on the production line such as the belt conveyor 15. Such components are connected to a controller (not shown) within the main body 1.

The controller, in response to the signals from the encoder 16 and the print sensor 17, controls the amount of electrostatic charge and the charge timing for ink particles discharged from a nozzle, so that the ink particles 10, which have been electrostatically charged and deflected during the passage of the print medium 13 through the vicinity of the ink discharge head 2, are made to adhere to the print medium 13, whereby text is printed thereon.

<Control Configuration of Ink-jet Recording Apparatus>

Figure 16:
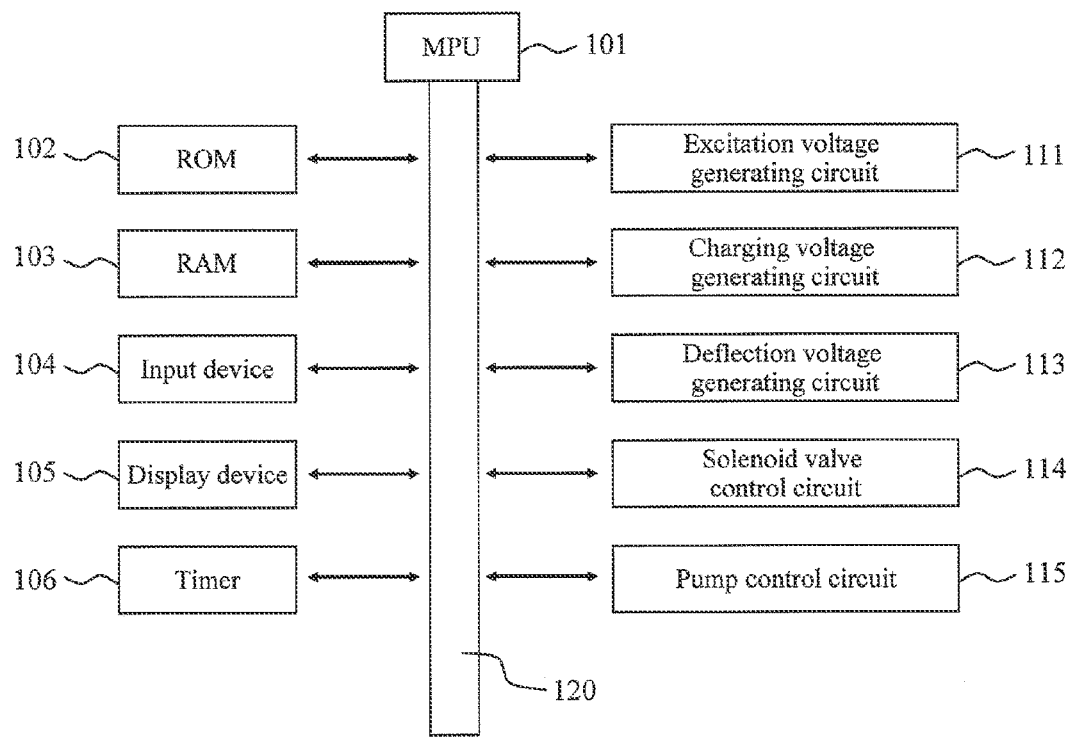
FIG. 16 is a functional diagram of an ink jetrecording apparatus in accordance with an embodiment of the present invention.

FIG. 16 is a block diagram illustrating the control configuration of the ink-jet recording apparatus 100. The ink-jet recording apparatus 100 includes, as its control configuration, an MPU 101 that has an arithmetic function and controls the entire ink-jet recording apparatus, ROM 102 that has stored therein programs or data necessary for operating the MPU 101 via a bus 120, RAM 103 in which data necessary for the execution of programs is temporarily stored, an input device 104 into which print text information as well as set values is entered, a display device 105 that displays the information entered into the input device 104, conditions, and the like, a timer 106 that measures the time that has elapsed since the given processing, an excitation voltage generating circuit 111 that generates an excitation voltage to be applied to a driven element that is mounted on a nozzle 351 for the purpose of breaking the ink discharged from the nozzle 351 into particles, a charging voltage generating circuit 112 that generates a charging voltage to be applied across charging electrodes 352 for charging ink particles 360, a deflection voltage generating circuit 113 that generates a deflection voltage to be applied across deflection electrodes 353 for deflecting the charged ink particles 360 in accordance with the print text information, a solenoid valve control circuit 114 that controls solenoid valves to be opened or closed to allow the flow of ink or solvent, and a pump control circuit 115 for rotating a motor that drives all of the pumps at a constant speed.

<Filter Structure>

Figure 8:
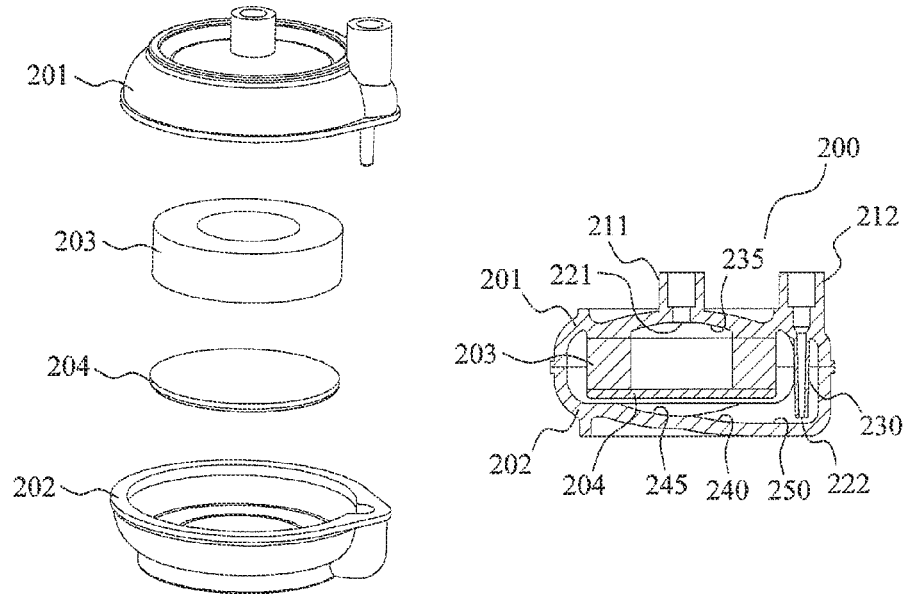
FIG. 8 are an exploded perspective view and a cross-sectional view of a filter of an ink-jet recording apparatus in accordance with an embodiment of the present invention.

FIG. 8 illustrates the structure of a filter 200 of the ink jetrecording apparatus 100. The filter 200 has a capsule formed by joining a capsule member 201 and a capsule member 202 together. Within the capsule is provided a cylindrical filter medium 203. One end face of the filter medium 203 is joined to the capsule member 201 and the other end face thereof is joined to a cap member 204. The capsule member 201 has two connecting ports 211 and 212 that communicate with each other through the filter medium 203.

An opening 221 inside the central connecting port 211 of the capsule member 201 is located at the center of a dome-shaped top surface section 235. Meanwhile, an opening 222 inside the peripheral connecting port 212 is located at the end of a pipe-shaped section 230. The capsule member 202 has on its inner side a dome-shaped bottom surface section 245 and a sloped section 240 that connects the dome-shaped bottom surface section 245 to the deepest section 250. It should be noted that the opening 222 of the capsule member 201 is located in proximity to the deepest section 250 of the capsule member 202 and the distance therebetween is preferably about 1 to 3 mm.

<Ink Circulation Structure of Ink-jet Recording Apparatus>

Figure 9:
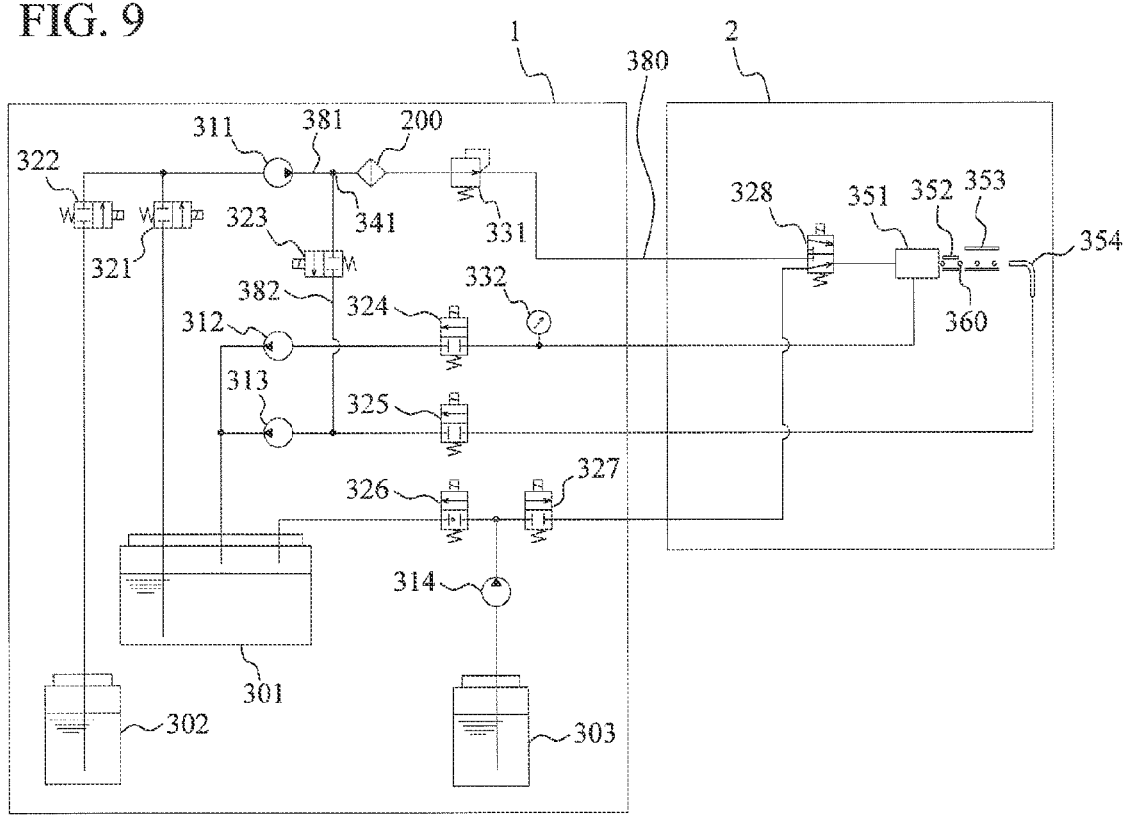
FIG. 9 is a systematic diagram of an ink circulation system of an ink-jet recording apparatus in accordance with an embodiment of the present invention.

FIG. 9 is a systematic diagram of an ink circulation system of the ink-jet recording apparatus 100 in accordance with an embodiment of the present invention. The ink jet recording apparatus 100 includes the main body 1 and the ink discharge head 2. In the main body 1, the filter 200 is disposed in a channel 380 between an ink container 301 and a nozzle 351 with a feed pump 311 interposed between the filter 200 and the ink container 301. In addition, a branch 341 leading to a channel 382 that communicates with a suction port of a recovery pump 313 is disposed in a channel 381 between the feed pump 311 and the filter 200. The peripheral connecting port 212 of the filter 200 is connected to the feed pump 311 side and the central connecting port 211 thereof is connected to the nozzle 351 side.

In normal operation, ink stored in the ink container 301 of the main body 1 is sucked and pressurized by the feed pump 311 and is transferred to the nozzle 351 of the ink discharge head 2 via the filter 200. At this time, a solenoid valve 321 and a three-way solenoid valve 328 are on and the channel between the ink container 301 and the nozzle 351 is open. In addition, a pressure-reducing valve 331 that adjusts the pressure of ink to an optimum value is disposed in the channel between the feed pump 311 and the nozzle 351, and a pressure gauge 332 that measures the pressure of ink in the channel is disposed in the channel between the nozzle 351 and a solenoid valve 324.

Ink that has reached the nozzle 351 is continuously discharged from the discharge orifice of the nozzle 351. The discharged ink is broken into ink particles 360 by the vibration of the driven element mounted on the nozzle 351. Among the ink particles 360, those used for printing are electrostatically charged by the charging electrodes 352 and deflected by the deflection electrodes 353, and then land on a print medium to form text thereon, whereas those not used for printing are not deflected but travel into an opening of a gutter 354 that is located along the direction straight ahead of the discharge orifice of the nozzle 351 and are collected into the ink container 301 by the recovery pump 313 for re-use purposes. At this time, a solenoid valve 325 is on and open.

When ink has been consumed by printing, a solenoid valve 322 is turned on and placed into an open position to compensate for the consumed ink, whereby ink in an ink supply reservoir 302 is supplied to the ink container 301 via the nozzle 351 and the gutter 354 by the feed pump 311 and the recovery pump 313. When the nozzle is not in operation, the ink can be supplied via the channel in which a solenoid valve 323 is disposed or the channel in which the solenoid valve 324 is disposed. The ink supply reservoir 302 can be directly supplied with ink from the outside.

When the amount of solvent in ink has decreased due to volatilization during operation, a solenoid valve 326 is turned on and placed into an open position to compensate for the decreased solvent, whereby the solvent is supplied to the ink container 301 from a solvent supply reservoir 303 by a solvent pump 314. The solvent supply reservoir 303 can be directly supplied with solvent from the outside.

At start-up of the operation, the solenoid valve 321, the solenoid valve 324, and the solenoid valve 328 are turned on and placed into an open position so that ink in the ink container 301 is circulated into the ink container 301 via the solenoid valve 324 by the feed pump 311 and a circulation pump 312. Accordingly, ink and air that have built up in the channel between the filter 200 and the three-way solenoid valve 328 while the nozzle was not in operation are circulated and the channel is refreshed.

While the nozzle is not in operation, solvent in the solvent supply reservoir 303 is pumped into the nozzle 351 by the solvent pump 314, and is discharged from the discharge orifice of the nozzle 351. Accordingly, the discharge orifice of the nozzle 351 is washed with the solvent and ink is prevented from building up on or adhering to inner side of the discharge orifice. At this time, a solenoid valve 327 is on whereas the solenoid valve 328 is off. Thus, the channel between the solvent supply reservoir 303 and the nozzle 351 is open.

<Ink Removal Operation>

Figure 10:
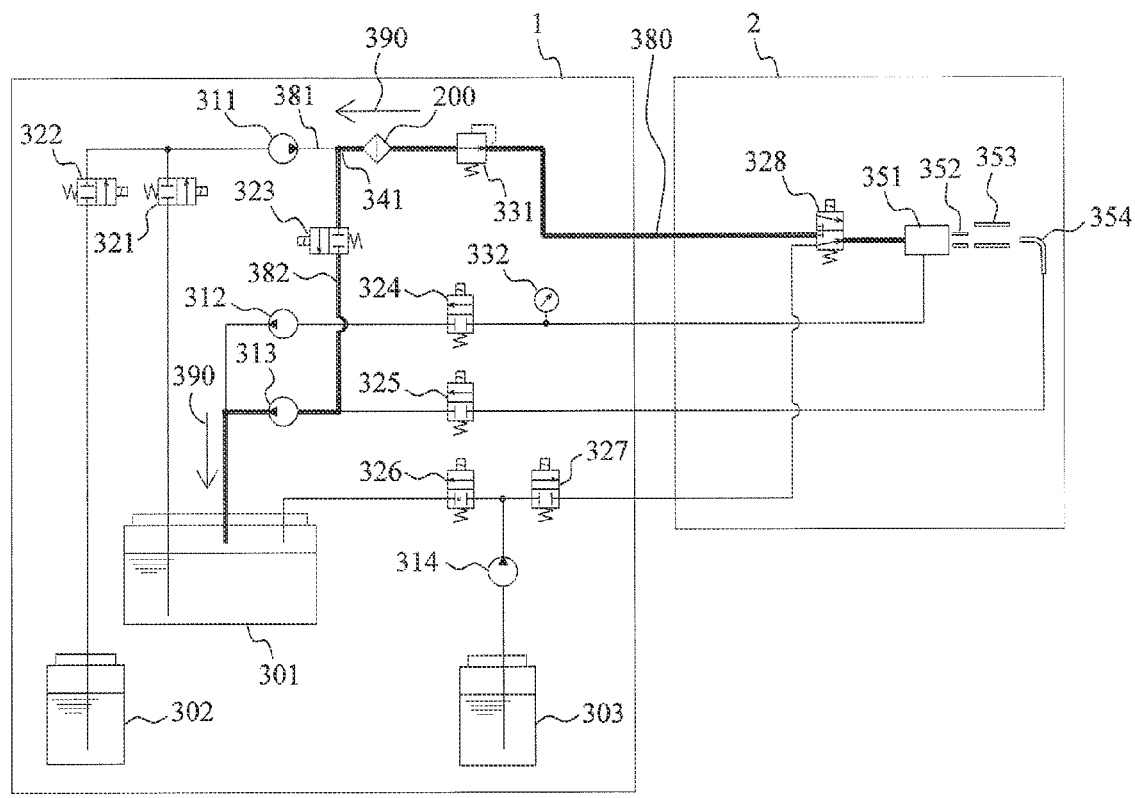
FIG. 10 is a systematic diagram illustrating the flow of ink in removal of the ink from a filter of an ink jetrecording apparatus in accordance with an embodiment of the present invention.

FIG. 10 illustrates the flow of ink in removal of the ink from the filter 200 of the ink-jet recording apparatus 100. Once the ink removal operation is initiated, the solenoid valve 323 and the solenoid valve 328 are turned on so that the channel 380 between the ink container 301 and the nozzle 351, in which are arranged the filter 200 and the solenoid valve 323, opens, so that ink flows in the direction of an arrow 390. Since the nozzle 351 is exposed to air through the discharge orifice, ink in the channel 380 is gradually displaced by air. When all the ink has been removed and displaced by air, the ink removal operation terminates.

Figure 11:
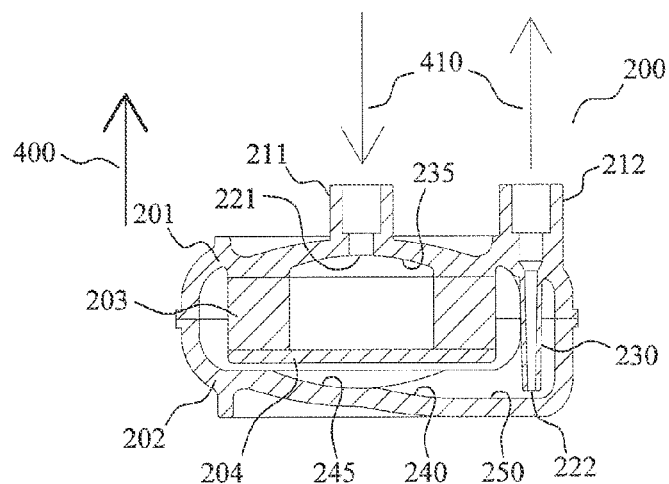
FIG. 11 is a cross-sectional view illustrating the orientation of a filter of an ink-jet recording apparatus in accordance with an embodiment of the present invention in removal of ink from the filter.

FIG. 11 illustrates the orientation of the filter 200 of the ink jet recording apparatus 100 in removal of ink from the filter. In FIG. 11, an arrow 400 indicates the upward direction. The filter 200 in the ink jet recording apparatus 100 is arranged such that the central connecting port 211 and the peripheral connecting port 212 face upwards. During removal of the ink, the ink flows in the direction from the central connecting port 211 to the peripheral connecting port 212 of the filter 200 as indicated by arrows 410, with the ink flowing in the direction of the arrow 390 (see FIG. 10). When ink in the channel 380 is being displaced by air, the air gradually enters the central connecting port 211 of the filter 200 and the ink is gradually discharged from the peripheral connecting port 212. Finally, ink located above the opening 222 is displaced by air, whereby almost all the ink in the filter 200 can be discharged.

Figure 17:
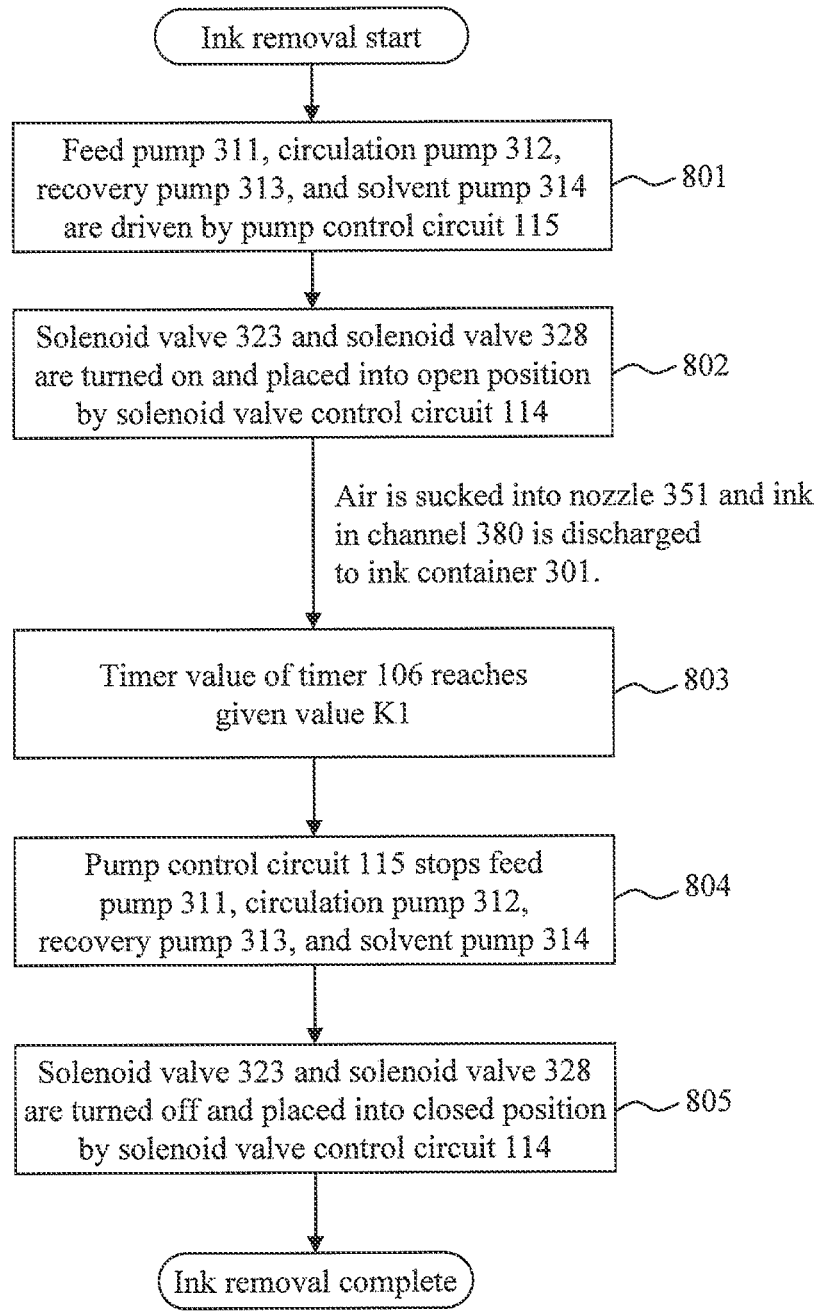
FIG. 17 is a flowchart illustrating the control operation in removal of ink from a filter of an ink-jet recording apparatus in accordance with an embodiment of the present invention.

FIG. 17 is a flowchart illustrating the control operation in removal of ink from the filter 200 of the ink-jet recording apparatus 100. First, in step 801, the pump control circuit 115 drives the feed pump 311, the circulation pump 312, the recovery pump 313, and the solvent pump 314 in response to an instruction indicative of the initiation of ink removal operation. Next, in step 802, the solenoid valve control circuit 114 turns the solenoid valve 323 and the solenoid valve 328 on to place them into an open position. At this time, air is sucked into the nozzle 351 so that ink in the channel 380 is discharged to the ink container 301.

Next, when the timer value has reached a given value K1 in step 803, the pump control circuit 115 stops the feed pump 311, the circulation pump 312, the recovery pump 313, and the solvent pump 314 in step 804. Then, in step 805, the solenoid valve control circuit 114 turns the solenoid valve 323 and the solenoid valve 328 off to place them into a closed position. Accordingly, the ink removal process terminates.

<Air Removal Operation>

Figure 12:
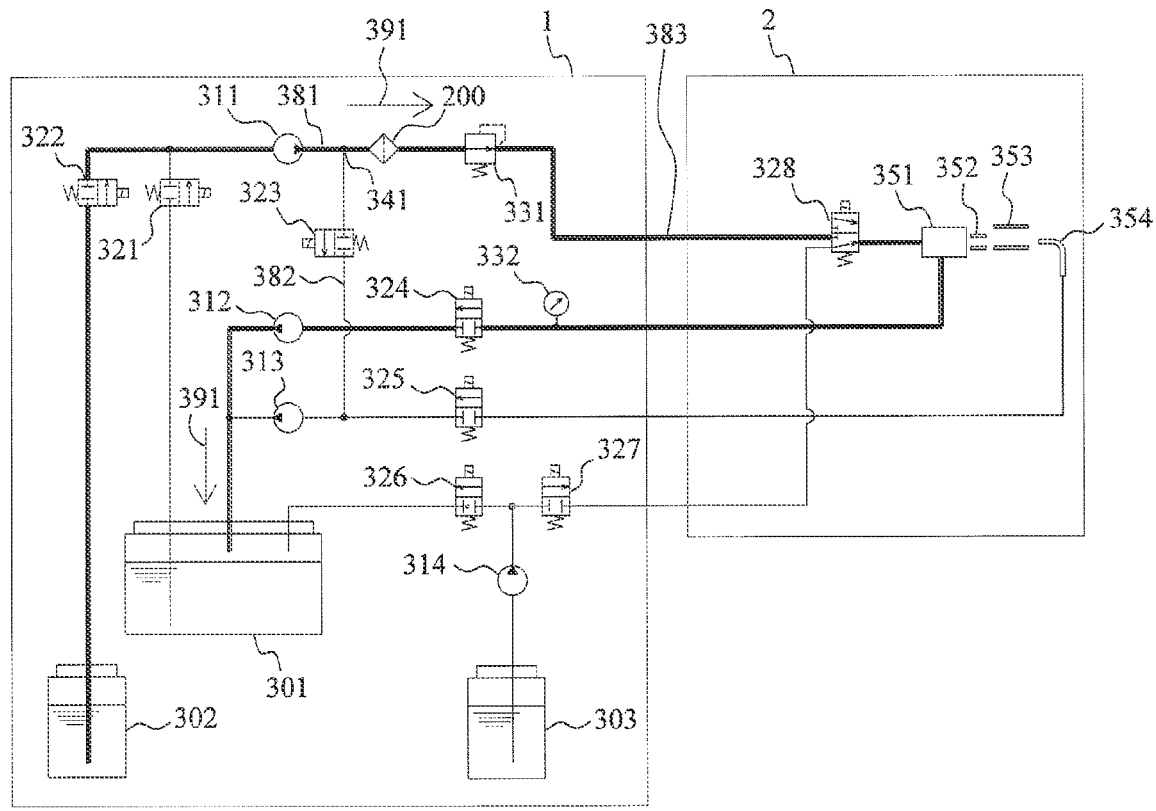
FIG. 12 is a systematic diagram illustrating the flow of ink in removal of air from a filter of an ink-jet recording apparatus in accordance with an embodiment of the present invention.

FIG. 12 illustrates the flow of ink in removal of air from the filter 200 of the ink-jet recording apparatus 100. Once the air removal operation is initiated, the solenoid valve 322, the solenoid valve 324, and the solenoid valve 328 are turned on. Then, the channel 383 between the ink supply reservoir 302 and the ink container 301, in which are arranged the filter 200, the nozzle 351, and the solenoid valve 324, opens, so that ink flows in the direction of an arrow 391, and air in the channel 383 is gradually displaced by the ink.

Figure 13:
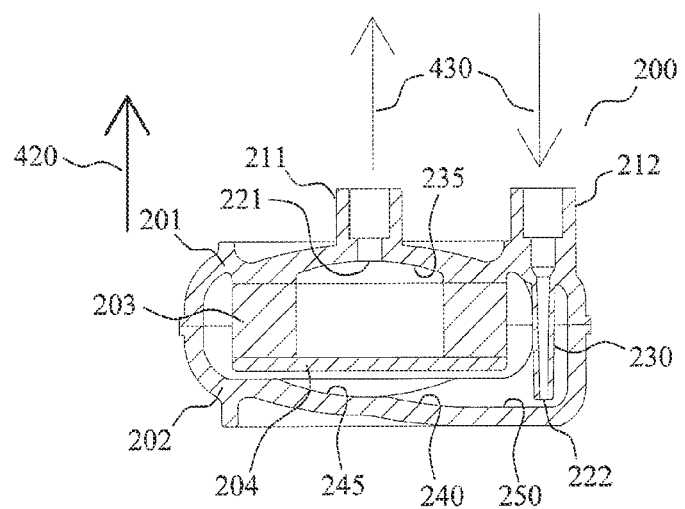
FIG. 13 is a cross-sectional view illustrating the orientation of a filter of an ink-jet recording apparatus in accordance with an embodiment of the present invention in removal of air from the filter.

FIG. 13 illustrates the orientation of the filter 200 of the ink jet recording apparatus 100 in removal of air from the filter. In FIG. 13, an arrow 420 indicates the upward direction. The filter 200 in the ink-jet recording apparatus 100 is, as in the removal of ink, arranged such that the central connecting port 211 and the peripheral connecting port 212 face upwards. In removal of air, ink flows in the direction from the peripheral connecting port 212 to the central connecting port 211 of the filter 200 as indicated by arrows 430, with the ink flowing in the direction of the arrow 391 (see FIG. 12). When air in the channel 383 is being displaced by ink, the ink gradually enters the peripheral connecting port 212 of the filter 200 and the air is gradually discharged from the central connecting port 211. Finally, almost all the air in the filter 200 can be discharged.

Figure 18:
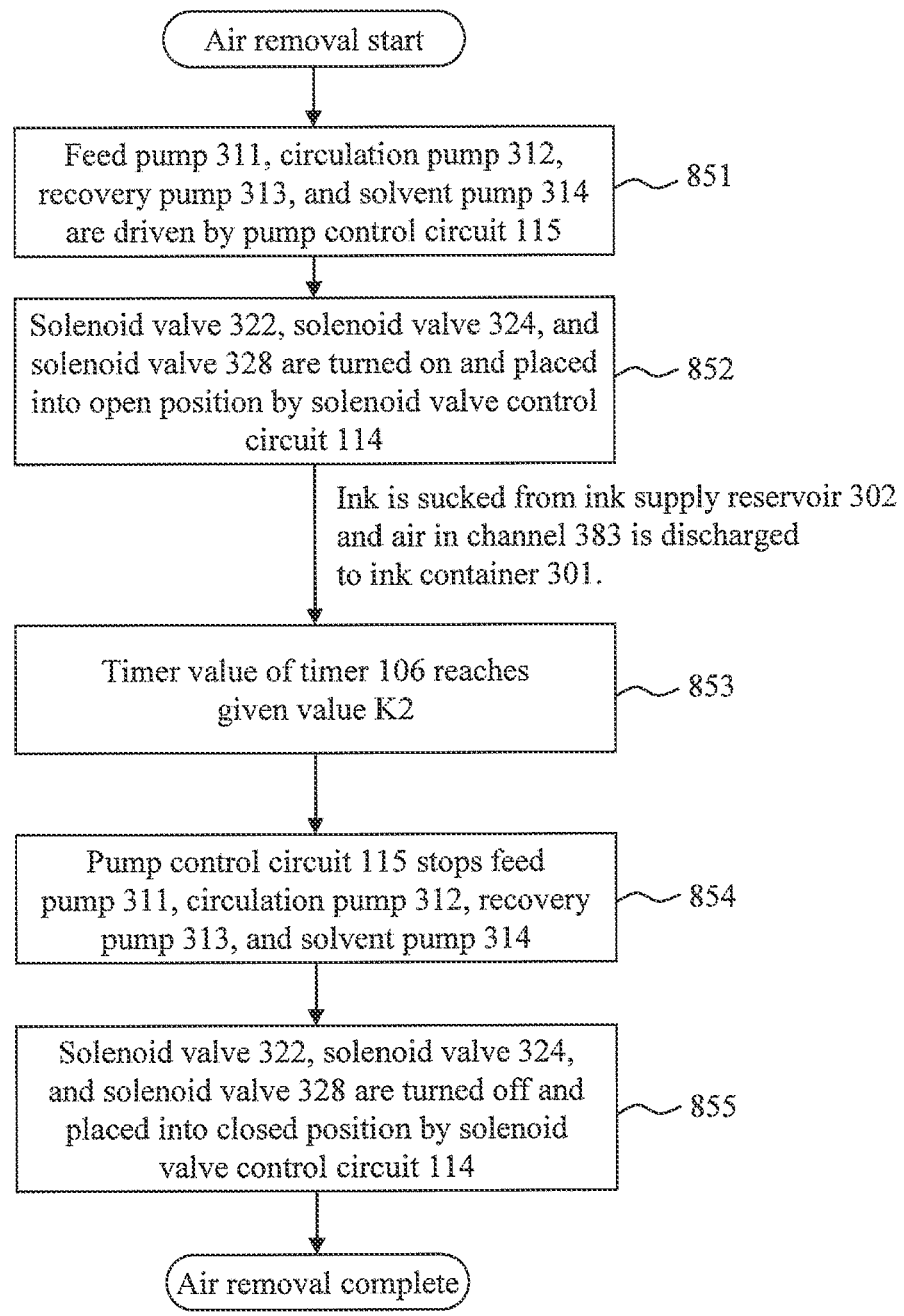
FIG. 18 is a flowchart illustrating the control operation in removal of air from a filter of an ink-jet recording apparatus in accordance with an embodiment of the present invention.

FIG. 18 is a flowchart illustrating the control operation in removal of air from the filter 200 of the ink jetrecording apparatus 100. In step 851, the pump control circuit 115 drives the feed pump 311, the circulation pump 312, the recovery pump 313, and the solvent pump 314 in response to an instruction indicative of the initiation of air removal operation. Next, in step 852, the solenoid valve control circuit 114 turns the solenoid valve 322, the solenoid valve 324, and the solenoid valve 328 on to place them into an open position. At this time, ink is sucked from the ink supply reservoir 302 so that air in the channel 383 is discharged to the ink container 301.

Next, when the timer value has reached a given value K2 in step 853, the pump control circuit 115 stops the feed pump 311, the circulation pump 312, the recovery pump 313, and the solvent pump 314 in step 854. Then, in step 855, the solenoid valve control circuit 114 turns the solenoid valve 322, the solenoid valve 324, and the solenoid valve 328 off to place them into a closed position. Accordingly, the air removal process terminates.

<Conclusion>

The upper capsule member of the filter of the present invention has a central connecting port and a peripheral connecting port. In addition, the upper capsule member has on its inner side a pipe section that extends from the peripheral connecting port. When the upper capsule member and the lower capsule member are joined together to form a single capsule, the end of the pipe section is adapted to be located in proximity to the bottom surface section (the deepest section) of the lower capsule member. When the filter is to be used with a liquid filtered therethrough (when air is to be removed), a liquid supplied from the peripheral connecting port via the pipe section is filtered by a filter medium, and the filtered liquid is output from the central connecting port. Accordingly, air in the filter can be completely removed and the possibility of abnormal printing can be reduced. Meanwhile, when a liquid is to be collected (when a liquid is to be removed), a liquid remaining in the filter is sucked into the end of the pipe section located in proximity to the deepest section of the filter. Accordingly, it is possible to collect the liquid so that almost no liquid would remain in the filter. Thus, the possibility of contamination resulting from leakage of residual liquids can be reduced in replacement of the filter.

An opening inside the central connecting port of the upper capsule member of the filter is located at the center of the dome-shaped top surface section. In addition, the lower capsule member has on its inner side a dome-shaped bottom surface section (the first bottom surface section) and the deepest section (the second bottom surface section), and also has a sloped section that connects the central portion of the first bottom surface section to the deepest section. The provision of such a dome-shaped top surface section allows the air in the filter to be more completely removed. In addition, since the center of the dome-shaped bottom surface section and the deepest section of the lower capsule member are connected with the slope, liquid in the filter can be efficiently collected.

When a filter is used in an ink jetrecording apparatus, such a filter is arranged in a channel between an ink container and a nozzle with a feed pump interposed between the filter and the ink container. In addition, a branch leading to a channel that communicates with a suction port of a recovery pump is disposed in a channel between the feed pump and the filter. The filter is arranged in the ink-jet recording apparatus such that the central connecting port and the peripheral connecting port thereof face upwards. Accordingly, upon entry of air into the central connecting port, ink is discharged from the peripheral connecting port, and thus, the ink in the filter is displaced by the air. Accordingly, almost all the ink in the filter can be discharged. In removal of air, ink flows in the direction from the peripheral connecting port to the central connecting port. In such a case, air is discharged from the central connecting port upon entry of ink into the peripheral connecting port. Thus, almost all the air in the filter can be displaced by the ink.

Although this embodiment has described examples of the application of a filter to an ink-jet recording apparatus, such a filter can be applied not only to ink jetrecording apparatuses but also to apparatuses in general in which a liquid should be filtered.

What is claimed is:

1. An ink-jet recording apparatus comprising:
a nozzle that discharges ink used for printing;
an ink container in which the ink is stored;
a feed pump that pumps the ink to the nozzle;
a recovery pump that collects the ink into the ink container; and
a filter arranged between the nozzle and the ink container, the filter being adapted to filter the ink,
wherein:
the filter includes an upper capsule member having a central connecting port and a peripheral connecting port, a lower capsule member joined to the upper capsule member to form a capsule, and a filter medium for filtering the ink, the filter medium being arranged within the capsule that is formed by joining the upper capsule member and the lower capsule member together,
the peripheral connecting port is connected to the ink container side and the central connecting port is connected to the nozzle side,
the upper capsule member has a pipe section that extends, within the capsule, from the peripheral connecting port to the vicinity of the bottom surface of the lower capsule member, and
the ink supplied from the peripheral connecting port via the pipe section is filtered by the filter medium, and the filtered ink is output from the central connecting port.

2. The ink-jet recording apparatus according to claim 1, wherein a branch is provided in a channel between the feed pump and the filter, the branch leading to a channel that communicates with a suction port of the recovery pump.

3. The ink-jet recording apparatus according to claim 2, wherein the upper capsule member has on its inner side a dome-shaped top surface, and the central connecting port is arranged at the center of the dome-shaped top surface.

4. The ink-jet recording apparatus according to claim 3, wherein the lower capsule member has on its inner side a dome-shaped first bottom surface section, a second bottom surface section located opposite an end of the pipe section, and a channel connecting the first bottom surface section and the second bottom surface section, the channel being adapted to guide the filtered ink from the first bottom surface section to the second bottom surface section.

5. The ink-jet recording apparatus according to claim 4, wherein the channel of the lower capsule member has a sloped section leading from the central portion of the first bottom surface section to the second bottom surface section.

6. The ink-jet recording apparatus according to claim 1, wherein the filter is arranged such that the central connecting port and the peripheral connecting port face upwards.

\* \* \* \* \*